United States Patent
St. Clair et al.

(10) Patent No.: US 6,622,968 B1
(45) Date of Patent: Sep. 23, 2003

(54) GUIDED AIRBORNE VEHICLE, CARGO AND PERSONNEL DELIVERY SYSTEM

(75) Inventors: David St. Clair, El Monte, CA (US); Edward Strong, Orlando, FL (US)

(73) Assignee: Edward Strong, Orlando, FL (US)

(*) Notice: Subject to any disclaimer, the term of this patent is extended or adjusted under 35 U.S.C. 154(b) by 0 days.

(21) Appl. No.: 10/086,476

(22) Filed: Mar. 1, 2002

(51) Int. Cl.[7] .............................................. B64D 17/00
(52) U.S. Cl. ................................. 244/138 R; 244/142
(58) Field of Search ........................... 244/137.1, 137.2, 244/137.3, 137.4, 147, 151 A, 151 B, 138 R, 142

(56) References Cited

U.S. PATENT DOCUMENTS

| | | | | |
|---|---|---|---|---|
| 1,262,834 A | * | 4/1918 | Norberti ..................... | 244/139 |
| 1,900,891 A | * | 3/1933 | Crane ........................ | 244/139 |
| 2,404,673 A | * | 7/1946 | Volf ............................ | 280/30 |
| 2,484,853 A | * | 10/1949 | Parsons ................. | 244/138 R |
| 2,707,600 A | * | 5/1955 | Johson ........................ | 244/2 |
| 2,938,689 A | * | 5/1960 | Rollings ............... | 244/138 R |
| 2,964,139 A | * | 12/1960 | Wittl et al. ................. | 188/298 |
| 2,973,172 A | * | 2/1961 | Bixby .................... | 244/138 R |
| 3,015,463 A | * | 1/1962 | Gross ........................ | 244/147 |
| 3,156,442 A | * | 11/1964 | Pourchet ................ | 244/138 R |
| 3,266,757 A | * | 8/1966 | Guienne ................ | 244/138 R |
| 3,387,805 A | * | 6/1968 | Barnett et al. .......... | 244/138 R |
| 3,395,881 A | * | 8/1968 | Markham et al. ........... | 244/139 |
| 3,625,461 A | * | 12/1971 | Guienne et al. ........ | 244/138 R |
| 4,108,402 A | * | 8/1978 | Bowen ........................ | 244/139 |
| 4,342,437 A | * | 8/1982 | Farinacci ................ | 244/137.3 |
| 4,657,207 A | * | 4/1987 | Poling ........................ | 244/21 |
| 4,664,342 A | * | 5/1987 | Jones ........................ | 244/147 |
| 4,781,341 A | * | 11/1988 | Kasper ........................ | 244/13 |
| 5,039,036 A | * | 8/1991 | Rogers .................... | 244/138 R |
| 5,078,335 A | * | 1/1992 | David ........................ | 244/2 |
| 5,899,415 A | * | 5/1999 | Conway et al. ............. | 244/152 |
| 6,019,317 A | * | 2/2000 | Simmons et al. ........ | 244/138 R |
| 6,416,019 B1 | * | 7/2002 | Hilliard et al. ............. | 244/139 |

* cited by examiner

Primary Examiner—Charles T. Jordan
Assistant Examiner—Stephen A Holzen
(74) Attorney, Agent, or Firm—Malin, Haley & DiMaggio, P.A.

(57) ABSTRACT

A guided aerial delivery device which safely and precisely delivers a standard vehicle, personnel and/or cargo, from a high-flying aircraft, to a precise target or location. In the preferred embodiment, the aerial delivery device generally comprises a cage-like module, which encloses and secures a standard, motorized vehicle, a large "ram-air" type gliding parachute, a"drogue" parachute and a "fly-by-wire" control system. The vehicle, typically an ATV, needs no modification. The delivery device employs an onboard human pilot to navigate the module. Upon exiting the aircraft, a drogue parachute stabilizes the freefall of the vehicle and releases the large "ram-air" parachute. The use of a skilled pilot allows the aerial delivery device to be guided to a designated landing site. Upon landing, the vehicle is easily detached from its parachute member and driven away. The cage-like module can be removed from the vehicle in a matter of minutes, or in a preferred application it can be left on the vehicle for future drops and utilized for mission specific tasks on the ground, such as mounting supplies, weapons, instruments etc. The vehicle is fully functional with the cage-like module attached. In an alternate embodiment, a non-powered vehicle is integrated with the enclosure to act as a training vehicle. Upon landing, the training vehicle is simply hitched to a motorized vehicle and driven off.

35 Claims, 7 Drawing Sheets

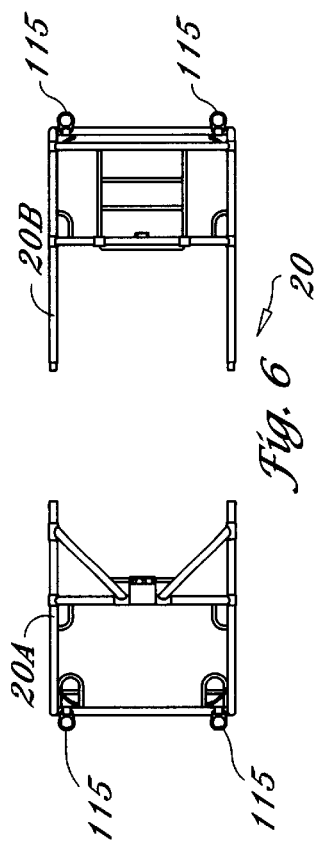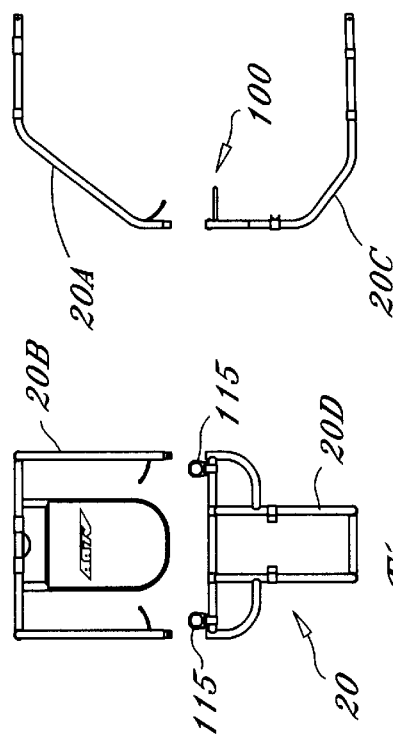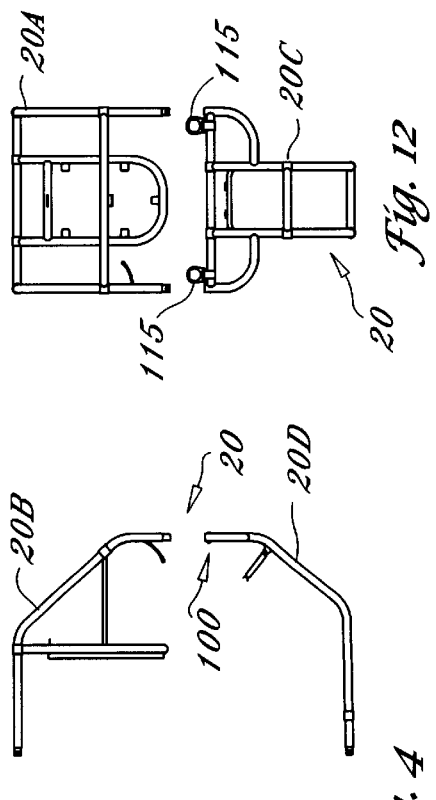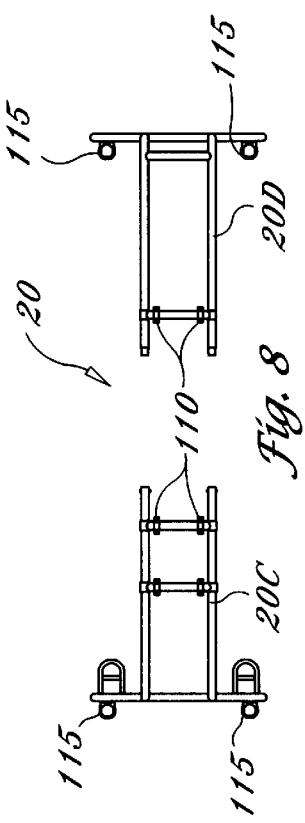

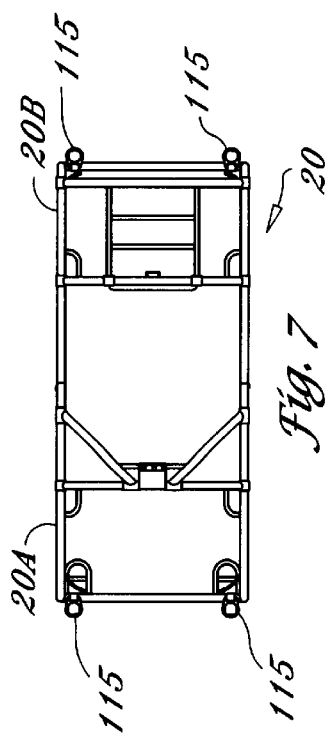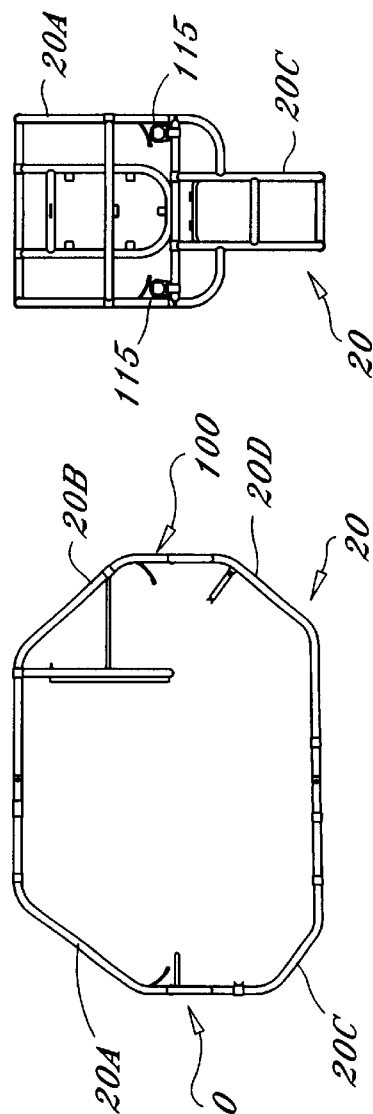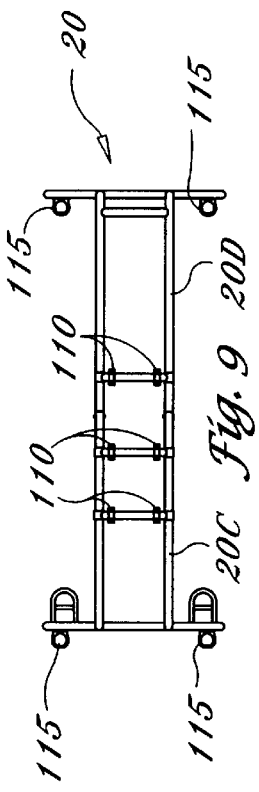

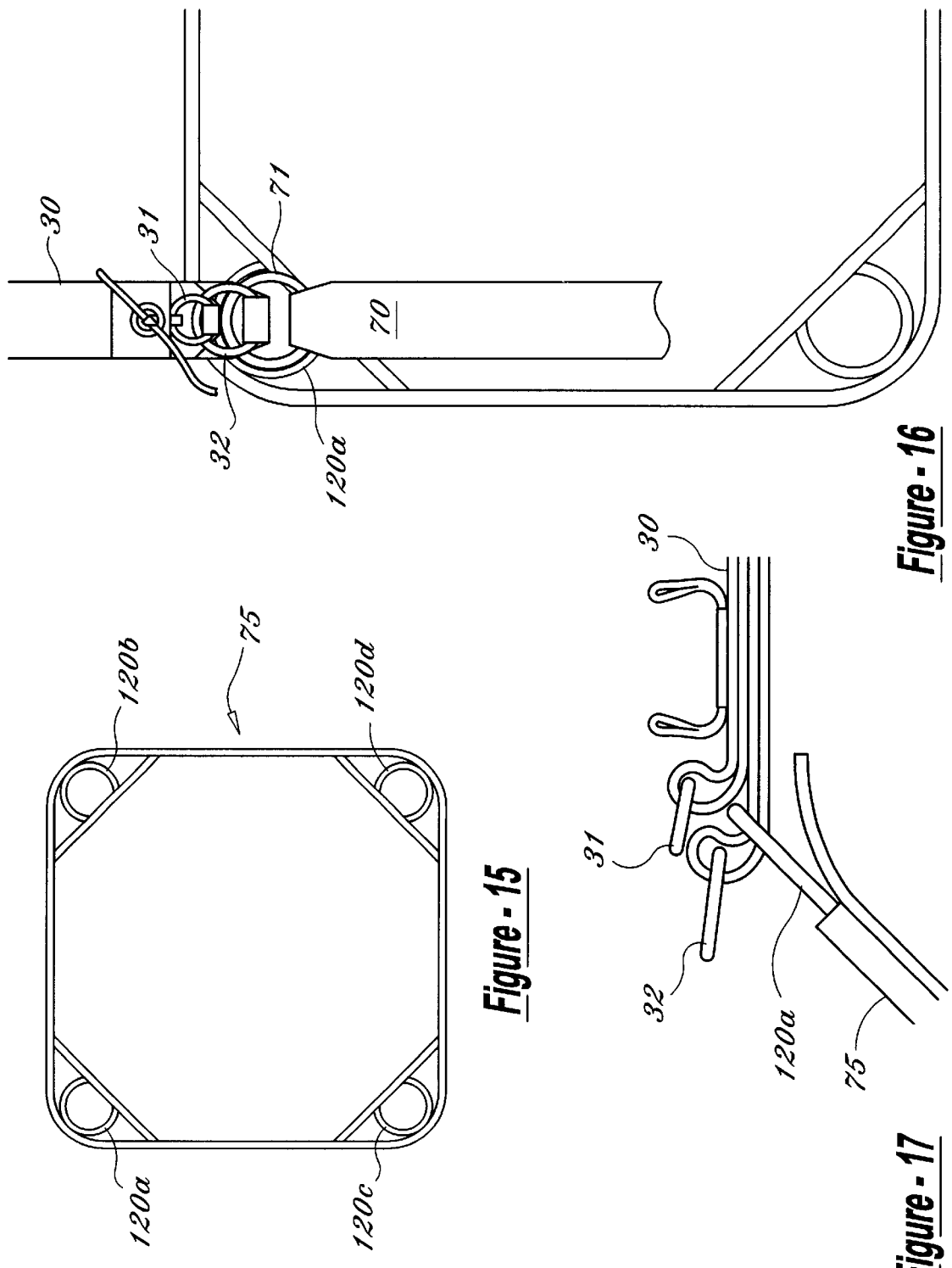

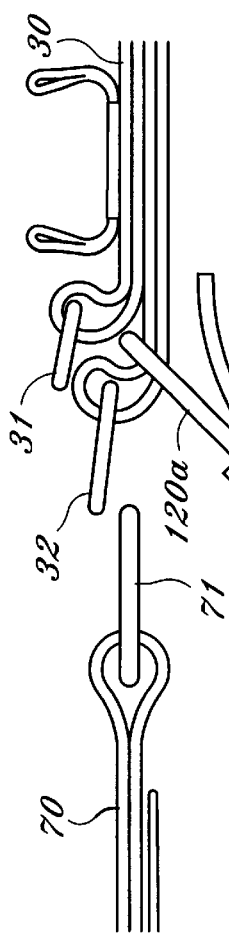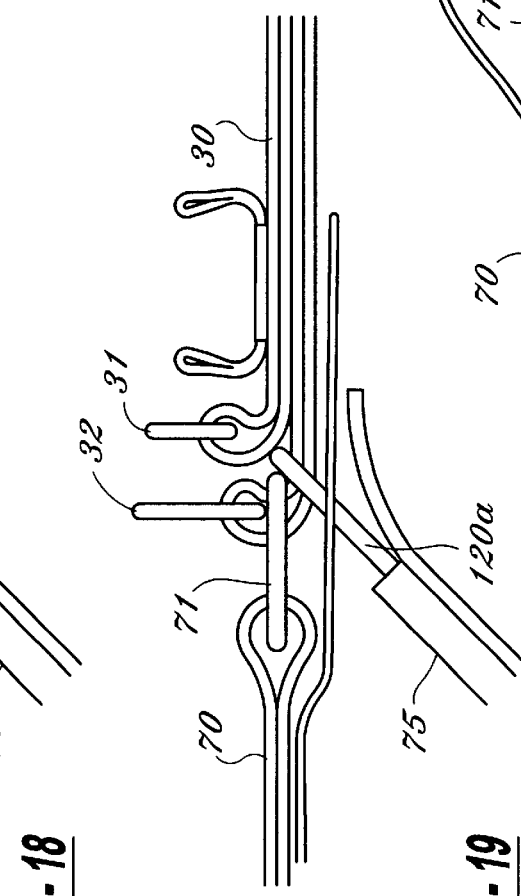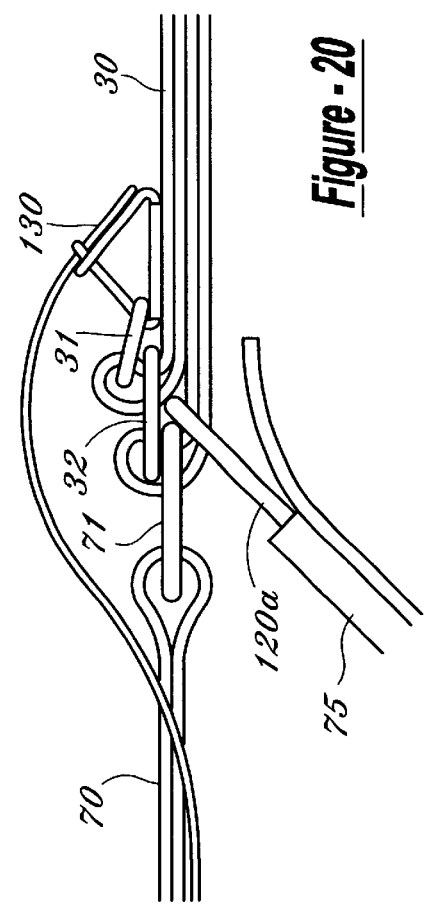

GUIDED AIRBORNE VEHICLE, CARGO AND PERSONNEL DELIVERY SYSTEM

BACKGROUND OF THE INVENTION

1. Field of the Invention

The present invention relates generally to guided airborne vehicle delivery systems and, more particularly, to a guided personnel and cargo airborne delivery system that releases, guides and delivers a manned vehicle from an aircraft to a specific target area.

2. Description of the Prior Art

It is common in the art to transfer personnel or cargo from an aircraft to a target on the ground via the use of parachutes. The tandem method of skydiving training delivers more than one person to a designated area. Particularly useful in the military, it is often necessary to deliver personnel from a high flying aircraft over enemy lines. However, getting people safely to the ground from the air is only half the battle. It has become essential to deliver people and/or cargo in a manned vehicle, which could simply land and be driven away with personnel and cargo aboard.

However, the prior art has been limited in its ability to delivery, from an aircraft, more than two people and/or equipment to a specific area with a single parachute. Due to unpredictable wind conditions, the module enclosing the vehicle can drift away from its intended target. To counteract this, aircraft must fly at lower altitudes to have a better chance of delivering its payload to its target. However, in a military scenario, this increases the chance of the aircraft being hit by enemy fire.

One problem inherent in most airborne vehicle delivery systems is that vehicles must be modified before being enclosed within a vehicle module or platform. It often takes several men, working several hours to modify the vehicle so that it may be fitted within the vehicle enclosure or platform. Needless to say, it is very expensive and impractical to purchase vehicles only to completely rework them in order to adapt them to common airborne delivery systems.

Another problem associated with airborne vehicle delivery systems is the length of time it takes to release the vehicle from its enclosure, upon landing. Although the military advertises that their airborne delivery systems allow you to "Drive It On, Drive It Off", in actual practice, upon landing, the ground personnel must go through a lengthy and complicated process of detaching the vehicle from its enclosure or platform before they are able to drive the vehicle away. Of course, in a military scenario, where speed is essential, this is not a practical way of delivering military vehicles, cargo and personnel.

What is therefore needed in the art is a guided airborne vehicle delivery system which can deliver a vehicle with a plurality of personnel and/or equipment to a specific target area from high altitude with the use of a single parachute, wherein the vehicle, upon landing, can be easily detached from its parachute and simply driven off. It is, therefore, to the effective resolution of the aforementioned problems and shortcomings that the present invention is directed.

SUMMARY OF THE INVENTION

The present invention provides a personnel-guided airborne vehicle delivery system which can be used to safely and accurately deliver an ordinary manned vehicle with personnel and/or cargo aboard, from a high-flying aircraft in flight, to a precise target or location on the ground, wherein the vehicle, upon landing, can be quickly and easily detached from its parachute and driven away.

In the preferred embodiment, the guided airborne delivery system generally consists of a vehicle module for housing a standard vehicle, the module being adjustable in size to house different-sized vehicles, and further comprises a plurality of vehicle attachment brackets, a large, "ram-air" type gliding parachute affixed to the module, a "drogue" parachute and a "fly-by-wire" control system.

The guided airborne delivery system provides a method of aerial delivery of vehicles, personnel and/or cargo under a ram-air canopy from an aircraft to a final landing target at a predetermined landing area on the ground.

A motorized vehicle with equipment and trained personnel on board is enclosed within a cage-like module. The module exits a high-flying aircraft, generally as high as 25,000 feet. Upon exit, a stabilization "drogue" parachute is static-line deployed. The manned vehicle falls under the stabilizing drogue until released by the on-board driver and/or an automatic activation device (AAD). Release of the drogue deactivates the releasable locking plate on the bottom of the container/deployment bag, allowing the main parachute to be extracted. The main parachute is generally deployed at approximately 5,000 ft. above ground level (AGL). The driver can operate a steering system, generally comprised of servos that allow the steering of the ram-air main parachute, until the module and vehicle enclosed therein land safely at the designated target area. The steering system can also be controlled by a GPS operated device. During descent, the driver can start the vehicle's engine. Upon landing, the parachute can be released and the vehicle driven away.

The cage-like module is comprised of modular components and can be adjusted to house virtually any sized vehicle that can fit within the space constraints of the aircraft. The vehicle, typically an ATV, requires no modification. It is simply secured within the module at various points, typically the front and back and beneath the vehicle. The upper portion of the module provides protection and restraint for the on board driver(s).

The present invention is a low maintenance airborne transport vehicle that can provide, for example, military services with groundbreaking capabilities and greatly expand the range of tactical support. The apparatus of the present invention can be dropped with any combination of driver plus riders, and/or cargo, up to a weight dictated by the size of the main parachute, (for example, a 1200 sq. ft. parachute is limited to 1650 lbs.). It is designed with a built-in flexibility to meet required airborne-delivery requirements. The present invention is designed to be completely mobile even with the entire parachute system rigged and ready to exit the aircraft. The parachute system can be hooked up (rigged) off site such as in a hanger, and then simply driven into the aircraft. The module is designed to be a useful part of the vehicle even after landing. The cage-like module can be removed from the vehicle in a matter of minutes, or in a preferred application, can be left on the vehicle for future drops and utilized for mission specific tasks on the ground, such as mounting supplies, weapons, instruments, or the like. The vehicle is fully functional with the cage-like module attached.

The apparatus is low-profiled and streamlined, allows for the passage of air, and provides unlimited cargo tie-down locations. The apparatus also allows for the in-flight training of personnel, by re-configuring a module that seats two or more persons on an ATV.

In the preferred embodiment, the guided airborne vehicle delivery system comprises a vehicle module for housing a vehicle, wherein the module is adjustable in size to house different-sized vehicles, the module further comprises vehicle attachment means such as a plurality of bolts and clamps affixed at various attachment points on the module, a parachute member preferably a large "ram-air", type gliding parachute affixed to the module, and means for stabilizing the module during freefall.

Preferably, the attachment points along the module include at least an attachment point situated underneath the vehicle, an attachment point situated in front of the vehicle and an attachment point situated in back of the vehicle.

The module is comprised of a plurality of modular components adjustably interconnected with each other. Preferably, the means for stabilizing the module during freefall is a drogue parachute member attached to the parachute member. The vehicle enclosed in the module is preferably a manned, fully operational motorized vehicle, such as an ATV or SUV.

Upon landing of the module, the manned vehicle can be quickly and easily detached from the parachute member by pulling a release handle. The vehicle, containing personnel, and/or cargo, can then be driven away.

The drogue parachute and the ram-air type gliding parachute can be activated in a number of ways. For example, the drogue parachute can be static line deployed by dropping the vehicle out of an in-flight aircraft, or it can be hand deployed from inside an in-flight aircraft serving as an extraction device.

The ram-air type gliding parachute is activated upon the release of the drogue parachute member. This can be done manually via the on-board rider pulling a handle, or it can be done automatically via a parachute activation device (AAD) located on the main parachute container.

In an alternate embodiment, a non-motorized transport vehicle is provided, which includes similar parachute and steering capabilities as the preferred embodiment. Here, the vehicle is integrated with the cage-like module into one unit. The integrated vehicle-module unit comprises wheels, seats, and personnel safety restraints, a ram-air type gliding parachute affixed to the unit in a plurality of locations, means for stabilizing the unit during freefall such as the drogue parachute described above, and.means for steering the unit during parachute descent.

Upon landing, the ram-air parachute member is released as described above, and the unit can be hooked to a motorized vehicle on the ground via a trailer attachment. The motorized vehicle can be delivered, for example, via the method of the preferred embodiment of the invention.

The apparatus described in the alternate embodiment can be navigated during parachute descent via the onboard human pilot or a GPS control device. This allows the aerial delivery device to be guided to a designated landing site. The pilot and personnel are encapsulated within the module which provides protection to the occupants during exit from the aircraft, descent and the landing phase of the flight. The module is designed such that each occupant can easily egress the module in flight in the event of an emergency.

The apparatus in the preferred embodiment can be steered by an onboard pilot to its intended landing area by rotary actuators, each controlling a steering line. The steering lines are attached to a spool located on each actuator. The movement of the spool by the actuator causes the steering lines to wind in or out, thus allowing the pilot to safely and accurately guide the apparatus to a landing target.

Accordingly, it is an object of the present invention to provide a personnel guided aerial delivery system that includes a cage-like module that can house virtually any sized vehicle.

It is another object of the present invention to provide a personnel guided aerial delivery system which can safely deliver a manned vehicle under a ram-air canopy from a high-flying aircraft to a predetermined landing area.

It is still another object of the present invention to provide a personnel guided aerial delivery system which provides encapsulated protection for its occupants during exit, descent and landing.

It is yet another object of the present invention to provide an aerial delivery system which is controlled by an occupant.

It is an even further object of the present invention to provide an aerial delivery system which is reusable and requires relatively minimum maintenance.

In accordance with these and other objects which will become apparent hereinafter, the instant invention will now be described with particular reference to the accompanying drawings.

BRIEF DESCRIPTION OF THE DRAWINGS

FIG. 4 is a side exploded view showing the major components of the vehicle module.

FIG. 5 is a side view of the vehicle module.

FIG. 6 is a top exploded view showing the major components of the vehicle module.

FIG. 7 is a top view of the vehicle module.

FIG. 8 is a bottom exploded view showing the major components of the vehicle module.

FIG. 9 is a bottom view of the vehicle module.

FIG. 10 is a front exploded view showing the major components of the vehicle module.

FIG. 11 is a front view of the vehicle module.

FIG. 12 is a back exploded view showing the major components of the vehicle module.

FIG. 13 is a back view of the vehicle module.

FIG. 15 is a top view of the locking plate of the present invention.

FIG. 16 is a top view of the three ring locking plate mechanism of the present invention.

FIG. 17 is a side view of the initial phase of the locking step showing the three ring locking mechanism whereby the locking plate ring is secured over the first container ring.

FIG. 18 is a side view of the riser and riser ring and the three ring locking mechanism.

FIG. 19 is a side view of the three ring locking mechanism after the riser has been secured to the three ring locking mechanism.

FIG. 20 is a side view of the final phase of the three ring locking mechanism whereby the riser has been secured and the entire apparatus secured via a cable.

DESCRIPTION OF THE PREFERRED EMBODIMENTS

Figure 1:
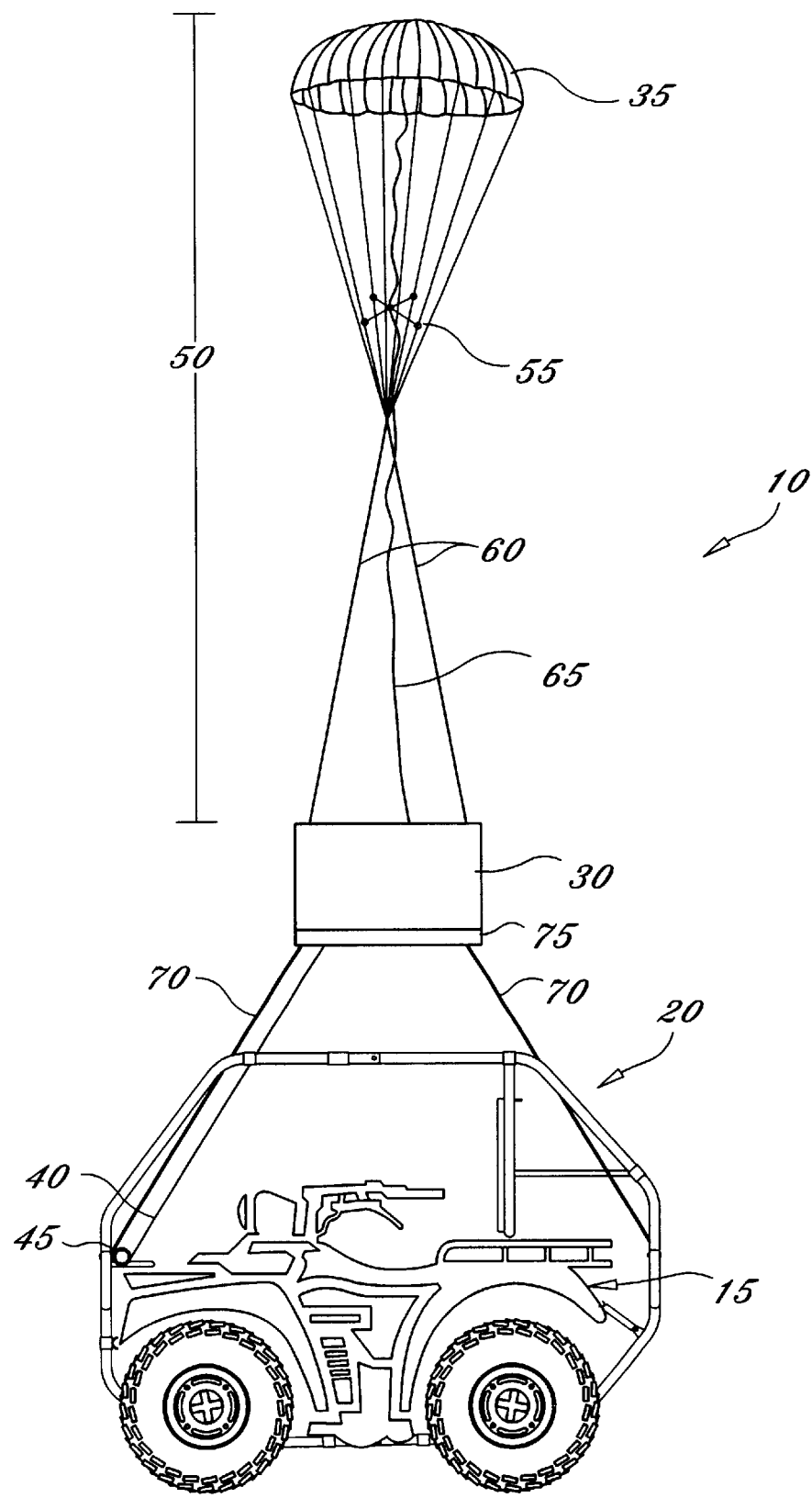
FIG. 1 is a side view of a guided airborne vehicle delivery system of the present invention in initial descent with the drogue parachute deployed.

As seen in the drawings, and specifically in FIG. 1, a guided airborne vehicle delivery system 10 in accordance with the present invention is shown. The aerial delivery system 10 generally consists of a vehicle module 20, a large "ram-air" type gliding parachute 25 (shown in FIG. 2) initially contained within a parachute container 30, a "drogue" parachute 35, a "fly-by-wire" control system including control lines 40 and actuators 45, and a manned standard vehicle 15, for example, an All Terrain Vehicle (ATV). For the purposes of clarity, vehicle 15, when contained within module 20, will be identified throughout this application as, collectively, "module 20", except where it is necessary to describe either the vehicle or the module individually.

FIG. 1 shows delivery system 10 in initial descent after a vehicle 15 has been secured within vehicle module 20 and dropped from an in-flight aircraft. When it is desired to drop the system 10, the exit doors of the aircraft are opened by conventional means, and module 20 can exit directly out of the aircraft either by being pushed, extracted, or driven out under its own power.

Drogue assembly 50 includes drogue parachute 35 that is static line deployed upon exit from the aircraft. A static line lanyard (not shown) is attached at one end to the aircraft and at the other end to the drogue deployment bag (not shown). Prior to deployment, drogue parachute 35 is housed within container 30, which is attached to module 20. Parachute container 30 is suspended between drogue parachute 35 and module during freefall. The static line lanyard deploys drogue parachute 35, as module 20 exits the aircraft. In an alternate embodiment, drogue parachute 35 can be utilized to extract module 20 from the aircraft.

The teaching of a drogue parachute can be found in U.S. Pat. No. 4,399,969, the disclosure of this patent incorporated herein by reference. Drogue parachute 35 can be any one of a number of design types including, ribbon, cross, ringslot, ringsail, ballute, etc. Drogue parachute 35 can be of different sizes depending on the total weight of the payload. Drogue parachute 35 reduces the terminal velocity of the vehicle delivery system and stabilizes module 20 for the remainder of the freefall descent. The drogue parachute 35 properly positions the device during initial descent.

The present invention utilizes a unique form of freefall configuration and main parachute 25 deployment. A drogue reefing slider 55 stages the opening of drogue parachute 35 for increased opening reliability and less shock. Drogue parachute 35 is connected to a drogue bridle 60, which is easily removable so longer and shorter lengths can be installed for different applications such as aircraft extraction, different vehicle sizes. Bridle 60 has two legs for increased stability of module 20. Bridle 60 also provides a channel to house a deflation line 65, which deflates drogue parachute 35 upon the deployment of the main ram-air parachute 25.

Parachute container 30 also serves as a deployment bag. This provides for easier packing and for fewer components, thus simplifying use. Parachute container bag 30 is suspended between drogue parachute 35 and module 20 during drogue (free) fall via risers 70 which are mounted in, but not limited to, four locations. Risers 70 are attached to module 20 via four three-ring releases, such as the three-ring release mechanism disclosed in U.S. Pat. No. 4,337,913 issued to Booth. The disclosure of U.S. Pat. No. 4,337,913 is incorporated herein by reference. However, it should be understood that the present invention is not limited to any specific release mechanism, and other conventional release mechanism can be utilized and are considered within the scope of this invention.

Module 20 is a tubular frame that wraps around vehicle 15, providing a "cradle" for the vehicle to sit in. By doing this, the parachute opening forces are taken by module 20 and not by vehicle 15. Module 20 is bolted to vehicle 15 and little or no modifications to vehicle 15 are needed. This makes module 20 very versatile, and able to adapt to many different vehicle shapes and sizes. The entire system 10, before parachute deployment, is self contained within module 20. Therefore no part of the parachute attaches to vehicle 15 itself. Upon landing, the rider pulls one handle to release canopy risers 70, allowing vehicle 15 to perform its given tasks. Module 20 does not hinder the normal functions of vehicle 15.

Figure 2:
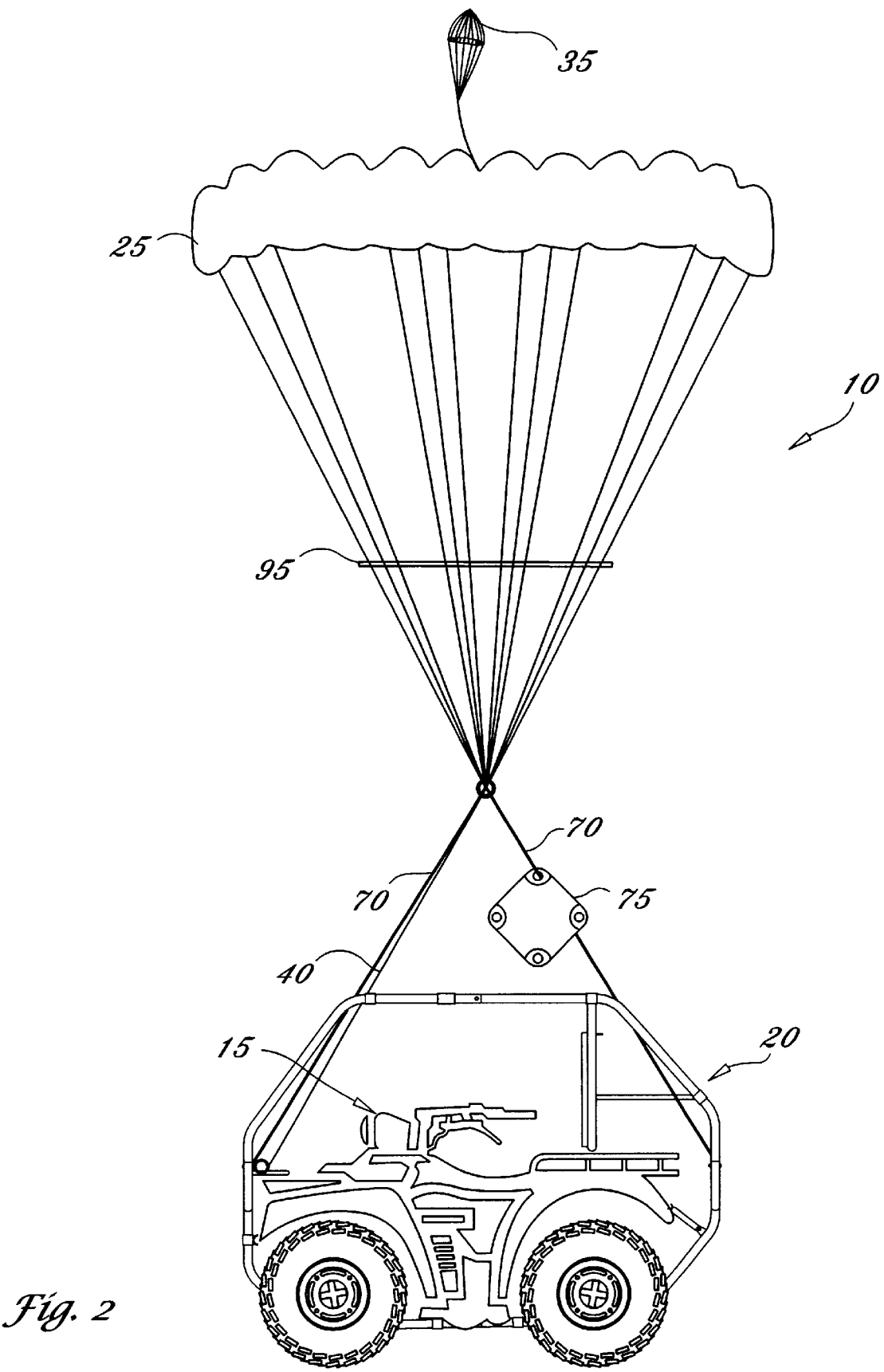
FIG. 2 is a side view of the guided airborne vehicle delivery system of the present invention in final descent with the main parachute deployed.

FIG. 2 illustrates parachute 25 after deployment, with drogue parachute 35 in its deflated state. The parachute deployment process is discussed in greater detail below.

To operate the present invention, module 20 is secured within an aircraft via three-ring release mechanism. After module 20 has been loaded within the aircraft, the occupant(s) are safely secured within the vehicle 15 via harnesses or similar securing means. The vehicle module 20 secures vehicle 15, one or more parachutes, the occupant(s), and the vehicle control system. Module 20 containing vehicle 15 then exits the aircraft and drogue parachute 35 is deployed, as described above.

When a predetermined main parachute opening altitude is reached, the onboard rider initiates main parachute 25 deployment by pulling an activation handle (not shown) mounted on top of module 20. A releasable locking plate 75 is attached to container 30 using a three-ring release at each of the four corners of container 30. The activation handle detaches the four three-ring releases on locking plate 75, allowing drogue parachute 35 to extract the container 30 off of locking plate 75, thus deploying main parachute 25 contained therein. Container 30 had previously been held shut by a locking plate 75. Locking plate 75 also retains the four risers 70 during drogue (free)fall, keeping them symmetrical with the container bag size.

Once locking plate 75 is released, the risers 70 are allowed to spread out in an unrestricted manner, which provides maximum stability for module 20. The opening forces are reduced by having container 30 already in the load-bearing path. This also keeps module 20 stable during deployment since the risers 70 remain loaded from freefall through deployment. Alternatively, the deployment sequence can be initiated via a conventional AAD or cutter.

Figure 3:
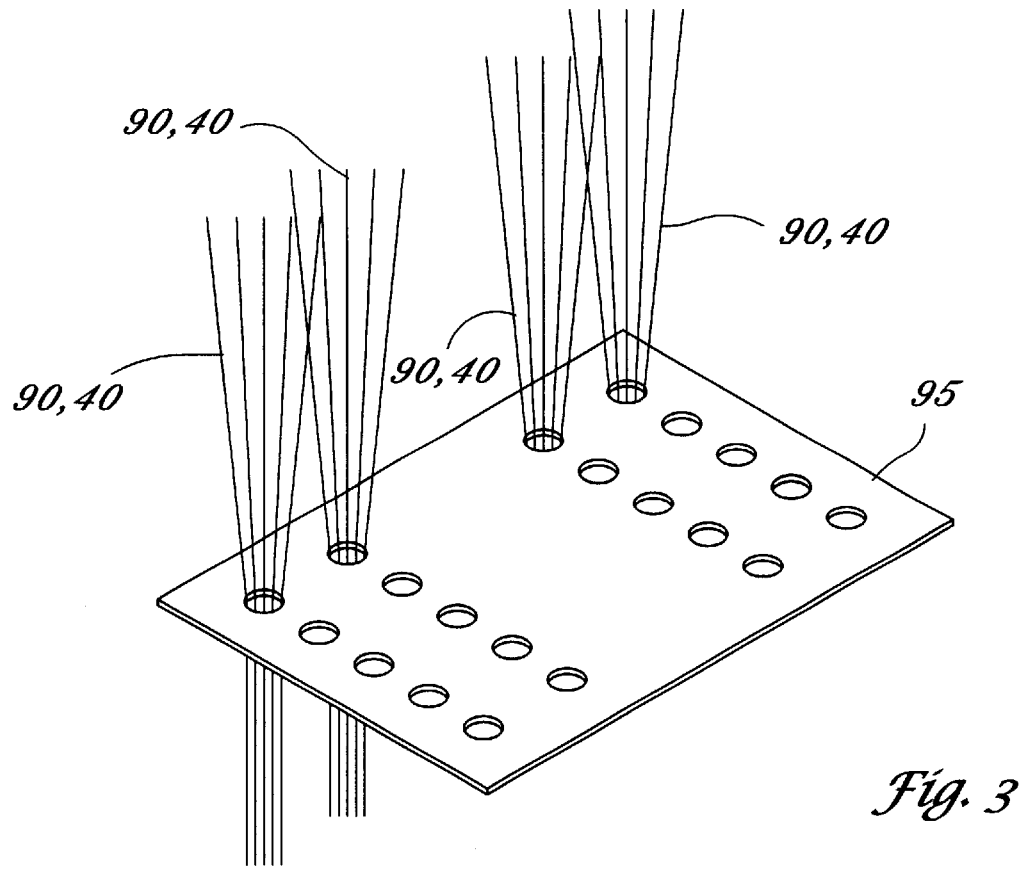
FIG. 3 shows a perspective view of the multi-grommet reefing slider of the present invention.

Another unique feature of the deployment process is the use of multi-grommet reefing slider 95, shown in FIG. 3. Unlike a conventional slider, which uses one grommet at each corner, the multi-grommet slider incorporates a plurality of grommets, usually but not limited to four rows with five grommets in each row, to isolate the suspension lines 90 and control lines 40 during deployment. The spacing of the grommet rows also provides a more controlled displacement of air to the parachute during inflation. This technology allows sliders to be used on large-scale parachutes, which have considerably more lines than conventional parachutes and unique opening characteristics.

Once the main parachute 25 is deployed, drogue parachute 35 is fully collapsed via a deflation line 65, similar to the deflation line shown in U.S. Pat. No. 4,399,969. The collapsed drogue parachute 35 remains attached to the main canopy by conventional attachment means. Thus, no components are lost during the deployment of main parachute 25.

After the main parachute canopy 25 has been fully deployed, the onboard rider (or pilot) steers the module 20 to its intended landing area. The pilot is able to control the canopy via two rotary actuators 45, one controlling a right steering line and one controlling a left steering line. One of the two control lines 40 can be seen in FIG. 1. The parachute's steering lines 40 are attached to a spool located on each actuator 45. The movement of the spool by actuator 45 causes steering lines 40 to wind in and/or out, clockwise or counterclockwise. The pilot controls each actuator 45 via two rocker switches or similar devices (not shown) located within easy reach within module 20. Each steering line 40 has a color-coded section, which allows the pilot to positively identify the position of the control stroke (i.e., full flight, half brakes, landing flare, etc.).

An alternative form of identifying the position of the control stroke is an LED read-out located in view of the pilot, which corresponds with the steering line position. The actuators are powered by either the vehicle's existing power supply or a remote battery mounted on the module.

Alternatively, module 20 can be steered to its designated landing area via a GPS guidance device controlling the rotary actuators. Either form of guidance mentioned above, manual or GPS, is capable of landing module 20 within ten (10) meters of a specified target area.

The vehicle's engine may be started at any point from aircraft exit through landing.

Upon landing, a one-handle pull mechanism releases the three-ring attachments 115 connecting the risers 70 to module 20, thus releasing the parachute member from the module. The control lines 40, which are attached to the module-mounted actuators 45, are severed by a knife cutter attached to its corresponding riser. Vehicle 15 can then be driven away fully functional to perform its given tasks.

The upper portion of module 20 may be detached by removing four attachment bolts 100 (shown in FIGS. 4 and 5) which secure the upper portions of the module to the lower portions. The preferred embodiment allows module 20 to remain on vehicle 15 after landing without hindering the performance of vehicle 15. Experience has shown that the module can facilitate a mission-specific purpose for the user by providing a means to mount supplies, weapons, and the like. Leaving module 20 connected to vehicle 15 also allows for a quick and easy turn around time for it's next aerial mission. All components of the present invention, with the exception of pyrotechnic cutters in the AAD, are re-usable, which greatly reduces cost and time.

FIGS. 4–13 show module 20 in various views, including exploded views showing the unassembled components of module 20 in greater detail, and other views showing the module as assembled.

Vehicle module 20 is a cage-like enclosure, seen clearly in the side views of FIG. 4 and FIG. 5. The enclosure is generally comprised of four modular components, a first upper portion 20A and a second upper portion 20B, and a first lower portion 20C and a second lower portion 20D. The upper portions 20A and 20B are of different diameters at their connection point and are joined together by fitting one of the upper portions into the other. They are secured via conventional securing means, such as quick release bolts or screws. The lower portions 20C and 20D are joined together and secured via similar means.

The relative size of vehicle module 20 can be changed by a simple manipulation of the connecting ends of the upper and lower portions. To house larger vehicles, the upper and lower portions are released and the portion having the smaller diameter is pulled to extend the relative size of the module. The components are then reattached. This method allows for different-sized vehicles to fit within the constraints of the module, without the need to reconfigure or modify the vehicle in any way.

Situated at the front and back ends and the underside of vehicle module 20 are a plurality of vehicle attachment brackets 110, shown clearly in FIG. 8 and FIG. 9. A vehicle can be secured inside of the vehicle module via these attachment brackets 110 and bolts, or any similar type of attaching hardware. Additional attachment points can be added along module 20 as deemed necessary for the particular vehicle being secured. It is important to note that vehicle 15 being inserted within module 20 requires no modification in order to fit within the vehicle module. Vehicle module 20 is adjustable in size, as described above, to receive virtually any size vehicle.

FIGS. 4–13 show various views of module 20, without vehicle 15 including both assembled and non-assembled views.

A very unique aspect of the present invention is that vehicle 15 is fully functional and mobile even with module 20 attached, which presents great advantages to the user. Prior to loading the aircraft, cargo can be added to vehicle 15 and secured therein. The entire parachute system 10 can be secured and rigged to module 20 in a remote location such as a hanger. Once the cargo and parachute system 10 is rigged, vehicle 15 can be loaded onto the aircraft by literally driving it onboard.

In an alternate embodiment of the present invention, an airborne transport vehicle integrating a multiple-person seating capacity vehicle with the caged enclosure of the preferred embodiment, is provided.

Figure 14:
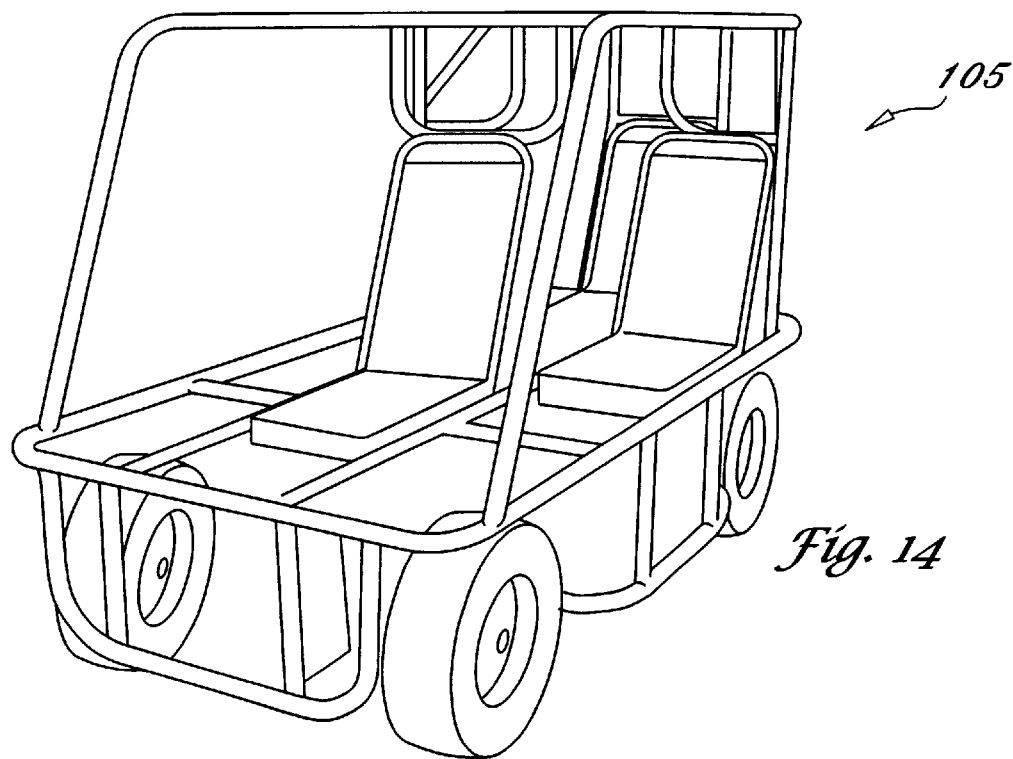
FIG. 14 is a perspective view of an alternate embodiment of the present invention showing and integrated vehicle/cage module.

A four person non-powered vehicle 105 of the alternate embodiment is shown in FIG. 14. In this embodiment, a caged enclosure is permanently integrated with the transport vehicle having a plurality of seats, and including the drogue and ram-air canopy parachutes discussed earlier. Each person has a personal backup parachute and is secured within the training module via harness restraints. The airborne transport vehicle 105 of the alternate embodiment is generally used to train personnel prior to utilizing the module of the preferred embodiment. The steering mechanism and parachute deployment schemes are the same as described for the preferred embodiment.

Upon landing, canopy 25 is released in the same manner as the present embodiment described above. Vehicle 105 then becomes a trailer and is attached to a powered vehicle via conventional trailer attachment means and towed away.

FIG. 15 provides a detailed view of locking plate 75. Locking plate 75 is releasably attached to container 30 at each of the four corners of container 30. The interconnection of locking plate 75, container 30 and the four risers 70 utilizing a three-ring locking mechanism is novel and critical to the invention, and are shown in detail in FIGS. 15–20.

Locking plate 75 includes four rings 120a–120d protruding from each corner of locking plate 75. Referring to FIG. 16, one corner of locking plate 75, one corner of container 30 and riser 70 is illustrated. Riser 70 includes ring 71, while container 30 includes rings 31 and 32.

To connect container 30, locking plate 75 and riser 70, ring 120a of locking plate 75 is first slid over ring 32 of container 30 as shown in FIG. 17. To secure the connection of riser 70, riser ring 71 of riser 70 is introduced and slid over container ring 32, as shown in FIGS. 18 and 19. Finally, the entire assembly is secured with cable 130, which is secured at its other end to module 20.

The instant invention has been shown and described herein in what is considered to be the most practical and preferred embodiment. It is recognized, however, that departures may be made therefrom within the scope of the invention and that obvious modifications will occur to a person skilled in the art.

We claim:

1. A guided airborne vehicle delivery system for delivering a standard vehicle with personnel and/or cargo from an aircraft to a desired ground destination, said vehicle delivery system comprising:
   a vehicle module for housing the vehicle, said module adjustable in size to house different-sized vehicles, said module further comprising vehicle attachment means;
   a parachute member affixed to said module;
   means for steering said module during descent; and
   means for stabilizing said module during freefall.

2. The guided airborne vehicle delivery system of claim 1 wherein said module is comprised of a plurality of modular components adjustably interconnected with each other.

3. The guided airborne vehicle delivery system of claim 1 wherein said means for stabilizing said module during freefall is a drogue parachute member attached to said parachute member.

4. The guided airborne vehicle delivery system of claim 1 wherein said vehicle attachment means include a plurality of attachment brackets affixed at various attachment points on the module.

5. The guided airborne vehicle delivery system of claim 4 wherein said attachment points on said module include at least an attachment point situated underneath said vehicle, an attachment point situated in front of said vehicle and an attachment point situated in back of said vehicle.

6. The guided airborne vehicle delivery system of claim 1 wherein said vehicle is a manned, fully operational motorized vehicle.

7. The guided airborne vehicle delivery system of claim 6 wherein, upon landing of said module, said vehicle can be quickly and easily detached from said parachute member.

8. The guided airborne vehicle delivery system of claim 3 wherein said drogue parachute is activated by dropping or by extracting said module out of an in-flight aircraft.

9. The guided airborne vehicle delivery system of claim 3 wherein said parachute member is automatically activated upon the release of said drogue parachute member.

10. The guided airborne vehicle delivery system of claim 3 wherein said parachute member is activated via parachute activation means situated within said module.

11. The guided airborne vehicle delivery system of claim 1 wherein said parachute member is of a gliding parachute type.

12. The guided airborne vehicle delivery system of claim 1 wherein said means for steering comprises:
   a pair of steering lines connected to said parachute member;
   control means for adjusting the position of one or more of said steering lines; and
   means for determining the position of said pair of steering lines.

13. The guided airborne vehicle delivery system of claim 12, wherein said position determining means is a color-coded section of the first steering line in view of the pilot and a color-coded section of the second steering line in view of the pilot.

14. The guided airborne vehicle delivery system of claim 12 wherein said control means includes a plurality of rotary actuators, said actuators attached to and controlled by switching means, said switching means causing each said actuator to wind in either a clockwise or counter-clockwise direction which in turn moves said attached steering lines to guide said module in flight.

15. The guided airborne vehicle delivery system of claim 1 wherein said means for steering is interfaced with a global positioning system for autonomous navigation of said module.

16. The guided airborne vehicle delivery system of claim 1 wherein said vehicle is an ATV.

17. The guided airborne vehicle delivery system of claim 3 where said parachute member is suspended between said drogue parachute member and said module during free fall by use of a releasable locking plate.

18. A guided airborne vehicle delivery system for delivering a standard, manned, fully operational motorized vehicle with personnel and/or cargo from an aircraft to a desired ground destination, said vehicle delivery system comprising:
   a vehicle module comprised of a plurality of modular components removably interconnected with each other for housing said vehicle, said module adapted to be adjustable in size to house different-sized vehicles, said module further comprising a plurality of attachment brackets affixed at various attachment points on the module, said attachment points including at least an attachment point on said module situated underneath said vehicle, an attachment point on said module situated in front of said vehicle and an attachment point on said module situated in back of said vehicle;
   a parachute member affixed to said module, and upon landing, easily detachable from said vehicle;
   a drogue parachute member attached to said parachute member; and
   means for steering said module during descent.

19. The guided airborne vehicle delivery system of claim 18 wherein said steering means comprises:
   a pair of steering lines associated with said parachute member;
   control means for adjusting the position of one or more of said steering lines, said control means comprising a plurality of rotary actuators, said actuators attached to and controlled by switching means, said switching means causing each said actuator to wind in either a clockwise or counter-clockwise direction which in turn moves said attached steering lines to guide said module in flight; and
   means for determining the position of said pair of steering lines comprised of a color-coded section of the first steering line in view of the pilot and a color-coded section of the second steering line in view of the pilot.

20. The guided airborne vehicle delivery system of claim 18 wherein said parachute member is activated via parachute activation means situated within said module.

21. The guided airborne vehicle delivery system of claim 18 wherein said drogue parachute is activated by dropping or by extracting said module out of an in-flight aircraft.

22. The guided airborne vehicle delivery system of claim 18 wherein said parachute member is automatically activated upon the release of said drogue parachute member.

23. The guided airborne vehicle delivery system of claim 18 wherein said parachute member is activated via parachute activation means situated within said module.

24. The guided airborne vehicle delivery system of claim 18 wherein said parachute member is of a gliding parachute type.

25. The guided airborne vehicle delivery system of claim 18 wherein said means for steering is interfaced with a global positioning system for autonomous navigation of said module.

26. The guided airborne vehicle delivery system of claim 18 wherein said vehicle is an ATV.

27. A guided airborne training vehicle delivery system for delivering a vehicle with personnel and/or cargo from an aircraft to a desired ground destination, said vehicle delivery system comprising:

an integrated vehicle-module training unit, said unit comprising wheels, seats, and personnel safety restraints;

a parachute member affixed to said unit;

means for steering said unit during descent; and means for stabilizing said unit during freefall.

28. The guided airborne training vehicle delivery system of claim 27 wherein said means for stabilizing is a drogue parachute member attached to said parachute member.

29. The guided airborne training vehicle delivery system of claim 27 wherein said drogue parachute is activated by dropping or by extracting said unit out of an in-flight aircraft.

30. The guided airborne training vehicle delivery system of claim 27 wherein said parachute member is automatically activated upon the release of said drogue parachute member.

31. The guided airborne training vehicle delivery system of claim 27 wherein said parachute member is activated via parachute activation means situated within said unit.

32. The guided airborne training vehicle delivery system of claim 27 wherein said parachute member is of a gliding parachute type.

33. The guided airborne training vehicle delivery system of claim 27 wherein said means for steering comprises:

a pair of steering lines associated with said parachute member;

control means for adjusting the position of one or more of said steering lines, said control means comprising a plurality of rotary actuators, said actuators attached to and controlled by switching means, said switching means causing each said actuator to wind in either a clockwise or counter-clockwise direction which in turn moves said attached steering lines to guide said unit in flight; and means for determining the position of said pair of steering lines comprised of a color-coded section of the first steering line in view of the pilot and a color-coded section of the second steering line in view of the pilot.

34. The guided airborne training vehicle delivery system of claim 27 wherein said means for steering is interfaced with a global positioning system for autonomous navigation of said module.

35. The guided airborne training vehicle delivery system of claim 27 wherein, upon landing, said training unit can be affixed to a motorized vehicle and driven off.

\* \* \* \* \*